J. H. MERRILL.
Breech-Loading Fire-Arm.
No. { 52, / 1,157. }
Reissued Mar. 26, 1861.
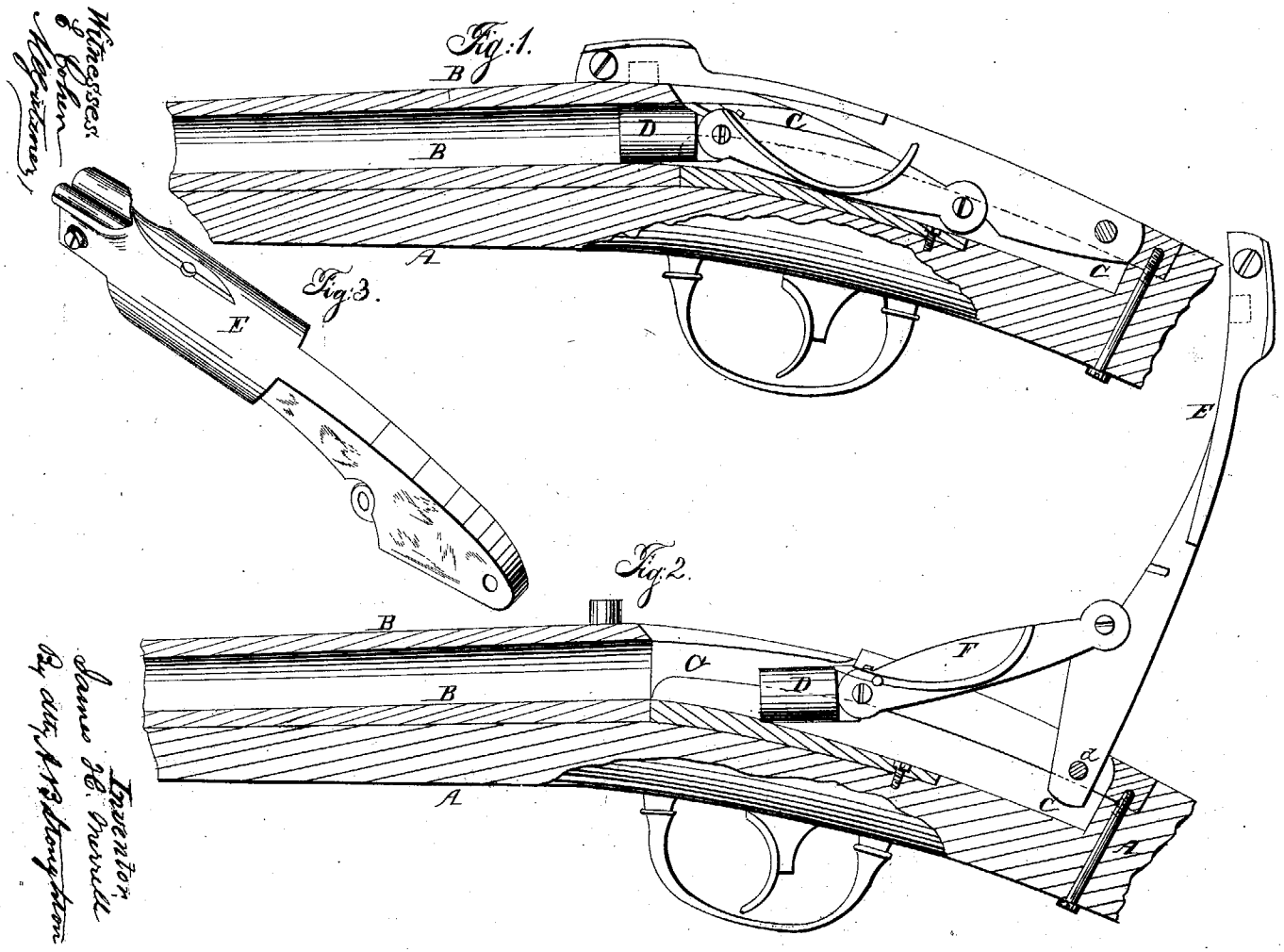
N. PETERS, PHOTO-LITHOGRAPHER, WASHINGTON, D. C.

UNITED STATES PATENT OFFICE.

THE MERRILL PATENT FIRE ARM MANUFACTURING COMPANY, OF BALTIMORE, MARYLAND, ASSIGNEE OF JAMES H. MERRILL.

IMPROVEMENT IN FIRE-ARMS.

Specification forming part of Letters Patent No. 20,954, dated July 20, 1858; Reissue No. 1,157, dated March 26, 1861.

DIVISION B.

*To all whom it may concern:*

Be it known that JAMES H. MERRILL, of the city and county of Baltimore, and State of Maryland, did invent certain new and useful Improvements in Breech-Loading Fire-Arms; and the following is a full, clear, and exact description of the same, reference being had to the accompanying drawings, making part of the same, in which—

Figures 1 and 2 represent longitudinal vertical sections through a portion of the gun, and showing it in two positions—viz., with the breech closed and with it open. Fig. 3 represents a perspective view of the lever that operates the piston or plug detached.

There are two important elements in a breech-loading gun that must be observed, as both tend to make the arm efficient, and the failure of either detracts from its general use under the most trying circumstances. First, it is important that the cartridge should be readily and easily placed in a chamber, from whence it is moved into the bore of the gun by the advancing piston. If while riding on horseback, or while the fingers are benumbed with cold, the user is obliged to hold his gun point down, or in any other position than horizontal across his lap or across his arm, he will find it troublesome, as he must also manage his horse. So, too, if his fingers be stiff with the cold and he is oblige to enter his cartridge carefully, point foremost, into the chamber, or if the must hunt after or feel for the proper place for inserting the cartridge, he will find it inconvenient and annoying; but if by holding his gun in a horizontal position and drawing back the plug a large open chamber be exposed, into which he may drop his cartridge, regardles of position, except that it be point foremost, and knows that the plug or piston moving through that chamber will certainly carry with it and put in its proper position for firing such cartridge, he would and could use such a gun with satisfaction; and, secondly, it is important that a swab-stick or cleaner should be run into the bore of the gun from the rear to cleanse it readily. Now, if the plug or piston came straight back and only far enough to admit the cartridge in an oblique line, the gun could not be wiped out, as the stick could not be entered; nor could the user insert his fingers to withdraw a cartridge if, for any reason, it became necessary to do so, and hence the said MERRILL found it necessary to make a large open chamber behind the barrel, to make said chamber droop or incline downward, and to draw down the plug or piston below the position it occupied when entering and leaving the bore of the gun, so that these desirable objects might be accomplished with ease and facility; and the nature of this part of the said MERRILL'S invention consists in combining with the open-ended barrel of the gun a large open drooping chamber, for the purpose of allowing the readily dropping of the cartridge therein, and facility in cleansing the bore of the gun by inserting a swab in the rear thereof.

To enable others skilled in the art to make and use this invention, the following description is given in connection with the drawings.

A represents a portion of the stock of the gun, and B a portion of the barrel, which barrel is open at its rear for the reception of the cartridge. Behind the rear of the barrel there is a long open chamber, C, which chamber as it recedes from the barrel droops or inclines downward, so as to allow the plug or plunger D, (which closes the barrel when the cartridge is inserted in it,) as it is drawn back, to fall below the plane of the bore of the gun, so that the user may catch the rear of the cartridge with his fingers, in case he desires to withdraw it for any purpose, and so that also he may run a cleaning-stick or swab into the bore to cleanse it. The piston or plug moves back far enough to leave an open space in front of it that will receive the cartridge dropped into it, as shown in Fig. 2.

E is a lever pivoted at *a* in the rear of the long open chamber C, and the lever is so made as that when shut down, as shown in Fig. 1, it will not only have several resisting points against the recoil from the explosion of the cartridge but will also cover or shield said open chamber to prevent anything from dropping into it. The plug or plunger D is connected to the lever E by a toggle-lever, F, and the movement of one or both of these levers may be controlled by a guiding mechanism that will properly draw down or raise up the said plug or piston, as it is pulled back or pushed forward by the lever E, to cause it to take the positions necessary for easy loading, ready cleaning, and accurate entrance into the bore of the gun.

The inclination of the piston or plunger D, it will be perceived, is toward the bore of the gun, so that it is not actually necessary that the cartridge should be carefully and accurately laid into the chamber, for the user, by simply feeling for the opening, without actually looking at it, cannot fail to properly enter the cartridge, for he naturally takes up the cartridge by its rear portion, and the front of the cartridge carrying the ball is of course the heavier part of it, and would be entered first, and the inclination of the piston thus guides the ball immediately into its proper position, to be run up into the bore. If the chamber did not droop, this inclination could not be given to the piston, and its guiding properties would not be had.

Having thus fully described the nature and object of this part of the said MERRILL'S invention, what is claimed under this patent is—

In combination with a barrel that opens out at its top, a long open drooping chamber in rear of it, for the purpose of easily dropping in the cartridge and the ready cleansing of the bore of the gun from the rear, substantially as herein represented.

THE MERRILL PATENT FIRE ARMS
MANUFACTURING COMPANY,
By JAMES H. MERRILL,
*Their President.*

Witnesses:
JOHN M. FRIEDRICH,
MAJ. T. SPARKS.